(12) United States Patent
Ambrose et al.

(10) Patent No.: US 7,625,973 B2
(45) Date of Patent: Dec. 1, 2009

(54) METHODS FOR PREPARING FLUOROPOLYMER POWDER COATINGS

(75) Inventors: Ronald R. Ambrose, Pittsburgh, PA (US); Anthony M. Chasser, Allison Park, PA (US); Kristin M. Bartlett, Pittsburgh, PA (US); Henry L. Lowman, Gibsonia, PA (US); Joanne M. Funyak, Cheswick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 592 days.

(21) Appl. No.: 11/064,904

(22) Filed: Feb. 24, 2005

(65) Prior Publication Data

US 2006/0189719 A1 Aug. 24, 2006

(51) Int. Cl.
*C08G 75/02* (2006.01)
(52) U.S. Cl. ...................................... 524/520; 523/333
(58) Field of Classification Search ................. 523/333; 524/520
See application file for complete search history.

(56) References Cited

U.S. PATENT DOCUMENTS

| | | | |
|---|---|---|---|
| 4,770,939 A | 9/1988 | Sietses et al. | 428/402 |
| 5,030,394 A | 7/1991 | Sietses et al. | 264/28 |
| 5,093,403 A | 3/1992 | Rau et al. | 524/404 |
| 5,177,150 A | 1/1993 | Polek | 525/199 |
| 5,229,460 A | 7/1993 | Yousuf et al. | 525/198 |
| 5,346,727 A | 9/1994 | Simkin | 427/486 |
| 5,405,912 A | 4/1995 | Simkin | 525/199 |
| 5,405,925 A | 4/1995 | Kappler et al. | 526/255 |
| 5,599,873 A | 2/1997 | Verwey et al. | 524/545 |
| 5,739,202 A * | 4/1998 | Pecsok | 524/520 |
| 5,932,657 A | 8/1999 | Rijkse et al. | 525/108 |
| 5,959,022 A | 9/1999 | Lin et al. | 524/520 |
| 6,018,000 A | 1/2000 | Keeny et al. | 525/178 |
| 6,037,412 A | 3/2000 | Rijkse et al. | 525/108 |
| 6,063,855 A | 5/2000 | Pecsok et al. | 524/520 |
| 6,221,429 B1 | 4/2001 | Verwey et al. | 427/195 |
| 6,340,720 B1 | 1/2002 | Lin et al. | 523/335 |
| 6,362,271 B1 | 3/2002 | Lin et al. | 524/520 |
| 6,362,295 B2 | 3/2002 | Gaboury et al. | 526/255 |
| 6,506,843 B1 | 1/2003 | Tsuda et al. | 525/199 |
| 6,551,708 B2 | 4/2003 | Tsuda et al. | 428/402 |

* cited by examiner

*Primary Examiner*—Edward J Cain
(74) *Attorney, Agent, or Firm*—Diane R. Meyers

(57) ABSTRACT

Methods for preparing pigmented and nonpigmented powder coating compositions are disclosed. The methods generally involve the use of dispersions comprising a fluoropolymer.

20 Claims, No Drawings

METHODS FOR PREPARING FLUOROPOLYMER POWDER COATINGS

FIELD OF THE INVENTION

The present invention is directed to methods for preparing pigmented and nonpigmented fluoropolymer powder coatings.

BACKGROUND INFORMATION

Coatings based on fluoropolymers are known for their outstanding exterior durability, providing tough finishes that offer at least some resistance to crazing, chalking and/or color change that can happen upon exposure to ultraviolet radiation and/or weathering. Fluoropolymer coatings can offer protection and/or decoration to a variety of substrates. Such coatings have numerous applications, such as in sheet metal and metal extrusions, architectural, and other building components. Preparation of fluoropolymer powder coatings has historically utilized cryogenic grinding. While other methods have been developed over the years, improved methods for making such coatings are desired.

SUMMARY OF THE INVENTION

The present invention is directed to methods for preparing nonpigmented fluoropolymer powder coatings comprising mixing a fluoropolymer with a dispersible resin compatible with the fluoropolymer and drying the mixture. The present invention is further directed to a method for preparing a pigmented fluoropolymer powder coating comprising blending a first dispersion comprising a fluoropolymer, and a second dispersion comprising a pigment, and drying the blend.

DETAILED DESCRIPTION OF THE INVENTION

The present invention is directed to methods for preparing nonpigmented fluoropolymer powder coatings. The methods generally comprise mixing a fluoropolymer with a dispersible resin compatible with the fluoropolymer. The mixture is then dried.

Any suitable fluoropolymer can be used according to the present invention. Examples include but are not limited to perfluoroalkoxy tetrafluoroethylene copolymer (PFA), ethylenechlorotrifluoroethylene (E-CTFE), ethylenetetrafluoroethylene (E-TFE), poly(vinylidene fluoride) (PVDF), poly(tetrafluoroethylene), poly(vinyl fluoride), poly(trifluoroethylene), poly(chlorotrifluoroethylene) (CTFE), and/or poly(hexafluoropropylene). Mixtures of two or more suitable fluoropolymers can be used, as can copolymers, terpolymers and the like of suitable fluoropolymers. In one embodiment of the invention, the fluoropolymer is not a copolymer and/or terpolymer of PVDF and other fluoropolymer(s). It will be appreciated that these fluoropolymers are widely commercially available, such as in solid or powder form.

The fluoropolymer is added to a dispersible resin compatible with the fluoropolymer. The dispersible resin can be, for example, water dispersible or solvent dispersible. Any dispersible resin that is compatible with the fluoropolymer can be used according to the present invention. Suitable dispersible resins include, for example, those comprising an acrylic, poly(vinyl acetate), poly(vinyl methyl ketone), polybutadiene and/or poly(urethane). Suitable acrylic monomers include one or more of t-butylamino methyl (meth)acrylate, (meth)acrylic acid, methyl (meth)acrylate, ethyl (meth)acrylate, butyl (meth)acrylate, hydroxyethyl (meth)acrylate, hydroxybutyl (meth)acrylate, hydroxypropyl (meth)acrylate and mixtures thereof. It will be appreciated that "(meth)acrylate" and like terms refers to both methacrylate and acrylate, as is conventional in the art. In certain embodiments, the resin is a water dispersible acrylic resin having acid functionality. By "water dispersible" is meant that the resin is a polymer or oligomer that is solubilized, partially solubilized and/or dispersed in some quantity of water with or without additional water soluble solvents. In certain embodiments, the solution is substantially 100 percent water. In other embodiments, the solution can be 50 percent water and 50 percent cosolvent, 60 percent water and 40 percent cosolvent, 70 percent water and 30 percent cosolvent, 80 percent water and 20 percent cosolvent, or 90 percent water and 10 percent cosolvent. Suitable cosolvents include, for example, glycol ethers, glycol etheresters, alcohols, ether alcohols, N-methyl pyrrolidone, phthalate plasticizers and/or mixtures thereof. In certain applications, it may be desirable to limit the amount of cosolvent.

The dispersible resin can also be solvent dispersible. A "solvent dispersible" resin is a polymer or oligomer that is solubilized in a solvent other than water. Suitable solvents include, but are not limited to, aliphatic hydrocarbons, aromatic hydrocarbons, ketones, esters, glycols, ethers, ether esters, glycol ethers, glycol ether esters, alcohols, ether alcohols, phthalate plasticizers, N-methyl pyrrolidone and/or suitable mixtures thereof. Phthalate plasticizers include phthalates esters such as diethylhexyl phthalate, diisononyl phthalate, diisodecyl phthalate, dioctyl phthalate, and butyl benzyl phthalate.

The fluoropolymer can be added or mixed by any means standard in the art, such as by using a Cowles mixer, a media mill, a rotor-stator mill and the like, until the desired particle size is achieved. The amount of fluoropolymer in the dispersion can range from 30 to 99 weight percent, based on total solid weight of the dispersion.

The fluoropolymer will typically be mixed with the dispersible resin until the dispersion is substantially homogenous. The mixture can then be dried according to any means known in the art. Particularly suitable methods for drying are spray drying, tray drying, freeze drying, fluid bed drying, single and double drum drying, flash drying, swirl drying, and numerous other evaporation techniques, the use of all of which will be familiar to those skilled in the art.

In certain embodiments of the present invention, the dry mixture can then be ground to a desired particle size. Grinding can be accomplished by any means known in the art, such as through the use of a classifying mill. Medium particle sizes of 20 to 50 microns are often desired for certain applications, such as 30 to 40 microns.

In certain embodiments, a crosslinker can be further added to the dispersion. The crosslinker can be any crosslinker suitable for reaction with a reactive group on the dispersing resin and/or itself. The crosslinker can be in solid or liquid form. Examples include hydroxyalkyl amides, such as those commercially available from EMS as PRIMID, glycidyl functional acrylics, triglycidylisocyanurate, carbodiimides, such as those commercially available from Dow as UCAR-LINK, melamines, such as those available from Cytec as CYMEL, and blocked isocyanates such as those available from Bayer as CRELAN.

The present invention is further directed to methods for preparing pigmented fluoropolymer powder coatings comprising blending a first dispersion comprising a fluoropolymer and second dispersion comprising a pigment. The dispersion blend is then dried. If desired, the dried blend can then undergo grinding. The drying and grinding are as described above. Blending can be done by any means known in the art, such as mixing with a low shear mixer or by shaking. In certain embodiments, one or both dispersions can be automatically dispensed from a computerized dispensing system. For example, to a first fluoropolymer dispersion can be added a second pigment dispersion, or a combination of second pigment dispersions, to achieve the desired color. The correct amount and type of second pigment dispersion(s) to add to the "base" fluoropolymer dispersion can be determined, for example, by use of color matching and/or color generating computer software known in the art.

The first dispersion comprising a fluoropolymer can be any of the dispersions described above.

The second dispersion comprising a pigment can comprise the same dispersible resin as the first dispersion, or a different dispersible resin. If different dispersible resins are used, they should be selected so as to be compatible both with each other, and with the fluoropolymer. In certain embodiments, both the first and second dispersions will be water based, in certain other embodiments both will be solvent based, and in certain other embodiments one will be water based and one will be solvent based. "Water based" means that the dispersion includes a water dispersible resin; "solvent based" means that the dispersion includes a solvent dispersible resin.

The pigment can be added to the dispersion in the same manner as the fluoropolymer. The amount of pigment in the dispersion can be any amount that imparts the desired color, such as from 1 to 50 weight percent, based on the total solid weight of the dispersion.

As described above, either or both of the dispersions can be water-based. Similarly, the solutions of either or both can be substantially 100 percent water, or can be 50 percent water and 50 percent cosolvent, 60 percent water and 40 percent cosolvent, 70 percent water and 30 percent cosolvent, 80 percent water and 20 percent cosolvent, or 90 percent water and 10 percent cosolvent, as described above.

In certain embodiments, it may be desired to partially or wholly neutralize any acid functionality on the dispersible resin. Neutralization can assist in the preparation of a water based dispersion. Any suitable neutralizing agent can be used, such as triethyl amine, triethanol amine, dimethyl ethanolamine, methyl diethanolamine, diethyl ethanolamine, diisopropyl amine, and/or ammonium hydroxide.

In certain embodiments, it might also be desirable to include a crosslinker in either or both of the dispersions. Any of the crosslinkers described above can be used.

In certain embodiments of the present invention, it may be desirable to ensure that the proper color for the coating is achieved. This can be done by doing, for example, a drawdown or spray out of the blended dispersions to see if the appropriate color is obtained. If not, more of the pigment dispersion or more of the fluoropolymer dispersion can be added to adjust the color accordingly. The adjusted blend can then be dried, or it can be further tested to confirm that the desired color is achieved. It will be appreciated that the present methods provide efficient ways to perform color matching, particularly as compared with traditional methods for powder coating preparation.

Any additives standard in the coatings art can be added to any of the dispersions described above. This includes, for example, fillers, extenders, UV absorbers, light stabilizers, plasticizers, surfactants, wetting agents, defoamers and the like. In formulating the dispersions described above, it may also be desirable to add additional dispersible resins the same as or compatible with that in which either of the pigment or fluoropolymer is dispersed in order to adjust the level of fluoropolymer or pigment.

Any suitable pigments can be used according to the present invention. As used herein, "pigment" and like terms refer generally to anything that imparts color to a composition; "pigment" and like terms therefore includes all colorants, such as pigments, dyes, and tints, including but not limited to those used in the paint industry and/or listed in the Dry Color Manufacturers Association (DCMA) as well as special effect compositions. A colorant may include, for example, a finely divided solid powder that is insoluble but wettable under the conditions of use. A colorant can be organic or inorganic and can be agglomerated or non-agglomerated.

Suitable pigments that may be used according to the present invention include, but are not limited to, the inorganic metal oxides, organic compounds, metal flake and mica pigments for "metallic" effect colors, extender or filler pigments, and corrosion-inhibitive pigment types, such as chromates, silicas, silicates, phosphates, and molybdates. Example of organic pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), and/or mixtures thereof. Examples of suitable inorganic pigments include titanium dioxide, carbon black, iron oxides, and/or calcined mixed metal oxides. Extender or filler pigments include kaolin, talc, calcium carbonate, diatomaceous earth, synthetic calcium silicates, perlite, cellulose fibers, ground silica, calcined clays, microspheres, fumed silica, treated fumed silicas, titanium dioxide, wet ground micas, synthetic fibers, snobrite clay, bentonite clay, micronized micas, attapulgite clays, and/or alumina trihydrate. In addition, leafing and non-leafing aluminums and micas may be incorporated with or without other pigments. Any amount of pigment suitable to impart the desired color can be used.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions, division of Eastman Chemical, Inc.

The colorant can be in the form of a dispersion including, but not limited to, a nanoparticle dispersion. Nanoparticle dispersions can include one or more highly dispersed nanoparticle colorants or colorant particles that produce a desired visible color and/or opacity and/or visual effect. Nanoparticle dispersions can include colorants such as pigments or dyes having a particle size of less than about 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Application Publication No. 2003/0125417, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,315 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Patent Application Publication No. 2003/0125416, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

The powder coatings prepared as described above can be applied by any means suitable in the art, such as by electrostatic spraying. They can be applied to any suitable substrate. It will be appreciated that the cure parameters will vary depending on the fluoropolymer and the dispersing resin, but such parameters can be readily determined by one skilled in the art. The coatings, once cured, can have any desired dry film thickness. Particularly suitable for most applications is a dry film thickness of 1 to 4 mils, such as 2 to 3 mils.

It will be appreciated that while in certain embodiments of the present invention a fluoropolymer is used in conjunction with an acrylic dispersion, these embodiments are not directed to acrylic modified fluoropolymers. In certain embodiments where acrylic is used, the acrylic does not have imide groups. In certain other embodiments of the present invention, the coatings specifically exclude a minor amount (i.e. 1 weight percent or less based on solids) of low molecular weight acrylic polymers (i.e. molecular weight less than 20,000) added as flow additives in addition to a dispersible resin, polyamide, polyether resins, poly(phenylene sulfide) and/or inorganic crystalline material.

It will be appreciated that the present invention eliminates the use of cryogenic grinding in the preparation of a powder fluoropolymer coating. The present coatings are also prepared without the use of drying the blend, which can lead to color separation during electrostatic spraying. It will be further appreciated that in certain embodiments, the fluoropolymer dispersions described herein are not latex dispersions. Finally, the present methods allow for dispersion of solids (i.e. solid fluoropolymer and/or pigment) without an aggressive milling step, such as a two roll mill.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Also, as used herein, the term "polymer" is meant to refer to prepolymers, oligomers and both homopolymers and copolymers; the prefix "poly" refers to two or more. Plural encompasses singular and vice versa. Thus, while the invention has been described in terms of "a" fluoropolymer, "a" dispersion, "a" pigment, "a" dispersible resin, "a" reactive group, and the like, one or more of any of these components can be used. Similarly, one or more of any of the other additives described herein can be used within the scope of the present invention.

EXAMPLES

The following examples are intended to illustrate the invention, and should not be construed as limiting the invention in any way.

Example 1

Dispersions of PVDF and $TiO_2$ (white) were made using the components listed in Table 1. The samples were ground in a metal beaker with zircoa media and a flat mixing blade. PVDF was ground until a 5 reading on a Hegman gauge was achieved; $TiO_2$ was ground to a 7 Hegman. The solutions were both substantially 100 percent water-based.

TABLE 1

|  | PVDF Dispersion Amount (g) | $TiO_2$ Dispersion Amount (g) |
| --- | --- | --- |
| Acrylic[1] | 243.2 | 121.6 |
| FOAMEX 830[2] | 2.0 | 1.0 |
| KYNAR 711[3] | 192.0 | — |
| TI-PURE R960[4] | — | 96.0 |

[1]89% methyl methacrylate, 8% methacrylic acid and 3% MPEG 350 methacrylate, 19.7% solids in water.
[2]Defoamer available from Tego Chemie.
[3]Powder form of polyvinylidene fluoride available from Arkema.
[4]Titanium dioxide available from DuPont.

Example 2

The dispersions of Example 1 were combined with additional acrylic as shown in Table 2.

TABLE 2

|  | Clear Coating Amount (g) | White Coating Amount (g) |
| --- | --- | --- |
| PVDF Dispersion | 100 | 100 |
| $TiO_2$ Dispersion | — | 15 |
| Acrylic[1] | 39.8 | 31.2 |

After mixing, the clear and white coatings were dried using a Buchi Mini Spray Dryer Model B-191. The dry powders obtained were electrostatically sprayed on aluminum panels and baked at 410° F. for 10 min. Resulting films were smooth. The white coating had uniform color.

Example 3

Dispersions of PVDF and $TiO_2$ were made using the components in Table 3, using the procedure given in Example 1. The solutions were about 90 percent water and 10 percent cosolvent.

TABLE 3

|  | PVDF Dispersion Amount (g) | $TiO_2$ Dispersion Amount (g) |
| --- | --- | --- |
| Acrylic[5] | 195.7 | 135 |
| SANTICIZER 278[6] | 17.5 | — |
| KYNAR 711 | 160 | — |
| TI-PURE R960 | — | 110 |
| DI water | 10 | — |

[5]92% methyl methacrylate, 8% methacrylic acid, 20.24% solids in a blend of water, diethylene glycol monomethyl ether and ethanol.
[6]Alkyl benzyl phthalate available from Ferro.

Example 4

The dispersions of Example 3 were combined with additional acrylic as shown in Table 4.

TABLE 4

|  | Clear Coating Amount (g) | White Coating Amount (g) |
| --- | --- | --- |
| PVDF Dispersion | 150 | 150 |
| $TiO_2$ Dispersion | — | 60 |
| Acrylic[5] | 55.0 | 22 |

After mixing, the clear and white paints were poured on glass panels and baked at 220° F. for one hour. The dried paint was scraped off the panels, dried for an additional hour, and ground in an air-classifying mill to a particle size median of 35 microns. The powders were sprayed on aluminum panels and baked at 410° F. for 10 min. Resulting films were smooth. The white coating had uniform color.

Example 5

A coating with crosslinker was made using the components in Table 5.

TABLE 5

|  | Clear Coating Amount (g) |
| --- | --- |
| PVDF Dispersion of Table 1 | 20 |
| PRIMID QM1260[7] | 0.13 |
| Acrylic[1] | 5.5 |

[7]Hydroxyalkylamine available from EMS

The material was applied as a draw down on aluminum substrate and baked at 410° F. for 10 min. The resulting coating had excellent adhesion and flexibility. Specifically, on a direct impact test performed according to ASTM D2794, the coating passed 120 in-lb.

Whereas particular embodiments of this invention have been described above for purposes of illustration, it will be evident to those skilled in the art that numerous variations of the details of the present invention may be made without departing from the invention as defined in the appended claims.

What is claimed is:

1. A method for preparing a nonpigmented fluoropolymer powder coating comprising:
   (1) mixing a solid fluoropolymer with a resin dispersion comprising a resin compatible with the fluoropolymer; and
   (2) drying the mixture of step 1.

2. The method of claim 1, wherein the resin comprises acrylic.

3. The method of claim 1, wherein the resin has functionality.

4. The method of claim 3, wherein the functionality is acid functionality.

5. The method of claim 3, wherein the resin is water dispersible.

6. The method of claim 1, wherein the resin is solvent dispersible.

7. The method of claim 1, further comprising the step of (3) grinding the dried mixture of step 2.

8. The method of claim 1, wherein the dispersion further comprises a crosslinker.

9. The method of claim 7, wherein the crosslinker comprises a blocked isocyanate.

10. The method of claim 1, wherein the fluoropolymer comprises poly(vinylidene fluoride).

11. A method for preparing a pigmented powder coating comprising:
   (1) mixing a solid fluoropolymer with a resin dispersion comprising a resin compatible with the fluoropolymer to form a first dispersion;
   (2) blending the first dispersion comprising the fluoropolymer; with a second dispersion comprising a pigment; and
   (3) drying the blend of step 2.

12. The method of claim 11, wherein the first and second dispersions are solvent based.

13. The method of claim 11, wherein the first and second dispersions are water based.

14. The method of claim 11, wherein one dispersion is water based and one dispersion is solvent based.

15. A method for preparing a pigmented powder coating comprising:
   (1) blending (a) a first dispersion comprising a fluoropolymer; and (b) a second dispersion comprising a pigment; and
   (2) drying the blend of step 1,
   wherein at least one of the dispersions is dispensed from a computerized dispensing system.

16. The method of claim 11, wherein the first and/or second dispersion comprise a water dispersible acrylic having acid functionality.

17. The method of claim 11, further comprising the step of (4) grinding the dried blend of step 3.

18. The method of claim 11, wherein either or both of the dispersions further comprise a crosslinker.

19. The method of claim 18, wherein the crosslinker comprises a blocked isocyanate.

20. The method of claim 11, wherein the fluoropolymer comprises poly(vinylidene fluoride).

* * * * *